United States Patent [19]
Giebel

[11] Patent Number: 6,073,848
[45] Date of Patent: Jun. 13, 2000

[54] DIGITAL AUTOMATIC GAIN CONTROL FOR MULTI-STAGE AMPLIFICATION CIRCUITS

[75] Inventor: James R. Giebel, Centerport, N.Y.

[73] Assignee: Symbol Technologies, Inc., Holtsville, N.Y.

[21] Appl. No.: 09/080,523

[22] Filed: May 18, 1998

[51] Int. Cl.[7] .................................................... G06K 7/10
[52] U.S. Cl. ............................. 235/462.26; 235/462.25
[58] Field of Search ........................ 235/462.26, 462.27, 235/462.25, 454

[56] References Cited

U.S. PATENT DOCUMENTS

| | | | |
|---|---|---|---|
| 4,387,297 | 6/1983 | Swartz et al. | 235/462 |
| 4,409,470 | 10/1983 | Shepard et al. | 235/472 |
| 4,496,831 | 1/1985 | Swartz et al. | 235/472 |
| 4,760,248 | 7/1988 | Swartz et al. | 235/472 |
| 4,789,995 | 12/1988 | Hurst et al. | 375/75 |
| 4,989,074 | 1/1991 | Matsumoto | 358/21 R |
| 5,168,148 | 12/1992 | Giebel | 235/462 |
| 5,276,685 | 1/1994 | Kepler et al. | 370/95.3 |
| 5,375,145 | 12/1994 | Abbott et al. | 375/98 |
| 5,408,698 | 4/1995 | Serizawa et al. | 455/245.1 |
| 5,668,505 | 9/1997 | Vu et al. | 331/49 |

*Primary Examiner*—Donald Hajec
*Assistant Examiner*—Karl Frech
*Attorney, Agent, or Firm*—Gary Serbin

[57] ABSTRACT

The present invention relates to a multi-stage digital Automatic Gain Control (AGC)circuit for selectively sampling the outputs of a serially connected amplification stages and for selectively controlling the gain of one or more stages in order to keep the amplitude of the final stage output within a predetermined range. The AGC provides a "quick" adjustment to overall system gain so that the system can produce a regulated signal within a short period of time, thereby improving the regulation response time. The AGC includes a number of serially connected amplification stages, and a gain controller. The output of each amplification stage, in addition to feeding the next amplification stage, is also an input to the gain controller. The gain controller receives the amplification-stage outputs, processes the outputs, determines the required gains of the various amplification stages and adjusts the gains via a number of gain control signals. The gain controller, in turn, includes a sensing logic for sensing and processing the amplification-stage outputs, and a gain adjuster for determining and adjusting the required gains. All the gains can be adjusted in a single cycle and the overall system gain can be quickly stabilized.

15 Claims, 5 Drawing Sheets

DIGITAL AUTOMATIC GAIN CONTROL FOR MULTI-STAGE AMPLIFICATION CIRCUITS

FIELD OF THE INVENTION

The present invention relates to a digital automatic gain control system for dynamically adjusting the gains of multi-stage amplification circuits. The system is especially useful for, but not limited to, automatically controlling the received signal amplitudes within optical and radio-frequency receivers.

BACKGROUND OF THE INVENTION

Typical bar code reading systems, such as the one described in U.S. Pat. No. 4,496,831, assigned to the same assignee as the present invention, generally include a light source, an optical system having focusing lenses for directing the light source across a bar code symbol, and a sensing means for detecting reflected light from the target bar code symbol being scanned. The light source is usually a semiconductor laser diode. The light generated by the laser diode passes through the optic train which focuses the beam to impinge upon the scanning means which is mounted in the light path within the scanning head of the device. The scanning means sweeps the laser beam across the bar code symbol and comprises at least one scanning motor. Light reflecting means such as mirrors are mounted on a motor shaft to direct the beam through an outlet port to the symbol. The sensing means then detects and processes the light reflected off the symbol, and generally comprises photosensitive elements such as a semiconductor photodiode. The detected light is converted into an electrical signal and is then passed through a receiver where the signal is amplified, processed, and subsequently decoded.

An Automatic Gain Control ("AGC") circuits are presently used in certain prior art laser scanning devices to dynamically adjust the overall receiver gain. The use of an AGC circuit allows the laser scanning device to decode symbols over larger distances than would be possible if the receiver gain of the device was fixed.

The AGC circuitry presently used in laser scanning devices requires many scans to correctly adjust overall receiver gain. This is because the response time of the AGC is dependent upon various factors including the configuration of the target bar code symbol being scanned, the physical distance between the bar code symbol and the scanner, and the amount of ambient light present in the field of view of the scanner. For instance, depending upon the ambient light conditions and the bar code symbol being scanned, the AGC response time can range from several hundred milliseconds and, in extreme cases, can be as long as several seconds. An example of how long AGC response time can be is shown by department store cashiers who use a hand-held laser scanner to decode the bar code symbols present on the merchandise. In many instances, the cashier must repeatedly scan the same symbol until the correct decodable symbol is obtained.

A typical analog AGC is disclosed in the U.S. Pat. No. 5,168,148, issued to Giebel and assigned to the assignee of the present invention. U.S. Pat. No. 5,168,148 is incorporated herein by reference. The receiver gain is controlled by monitoring and regulating the peak average value of the receiver's output signal. The receiver is comprised of several discrete amplifier stages that are connected in tandem to deliver a large overall gain from the input to the output of the receiver. The AGC circuit senses the final output of the receiver and adjusts the gain of one of the discrete amplifiers that is located in an early stage of amplification in the receiver. In effect, a feedback path is created from the output of the receiver through the AGC circuit to one amplifier that has an adjustable gain feature that the AGC circuit controls. This feedback allows the AGC circuit to regulate the output of the receiver at a constant amplitude despite any fluctuations in the magnitude of the input signal. The AGC circuit peak detects and filters the output signal which results in a direct current (d.c.) voltage which is proportional to the average peak value of the received signal. The circuit then compares this average peak value of the output signal to a fixed d.c. reference voltage and dynamically adjusts receiver gain in an attempt to reduce any difference between these two voltages.

The average peak value of the output voltage is used because it makes the AGC impervious to short duration large excursions of the output voltage which otherwise would introduce large errors in receiver gain. For example, a signal received by a bar code scanner could contain undesired receiver output excursions that result from reflections off of packaging material that is adjacent to the bar code being scanned. In sensing the average peak output, the AGC will be less sensitive to these undesirable signal excursions. Unfortunately, in order to accurately determine the average peak receiver output, the AGC requires many cycles of the input signal to reach a steady state gain setting. In some instances, it could take a long time for the AGC to finally set receiver gain properly.

The amount of time the AGC requires to reach steady state, for a given input, is commonly referred to as "attack time." Reducing the attack time in an AGC circuit, however, will also increase the error in the steady state output signal amplitude. Traditionally, the circuit designer in designing an AGC, trades off accuracy for any reduction in attack time. The end result of the design is an AGC that is relatively slow due to the accuracy requirements.

The AGC of the U.S. Pat. No. 5,168,148 has two inputs and a single output for AGC control. While having two inputs generally provides for preemptive sampling and may speed the AGC attack time, one of the two AGC inputs of the U.S. Pat. No. 5,168,148 is active only upon startup of the receiver and is essentially out of the circuit during normal operation of the system. In addition, the AGC circuit has a limitation on the maximum gains due to circuit instabilities.

In addition to the limitation imposed by the "attack time", the AGC response time is limited by the presence of large low-frequency components in the output signal. Large low-frequency components can cause the output amplifier to saturate. As a result, the higher frequency components of the output voltage signal which are used to set receiver gain, are clipped and therefore will not contribute to the gain setting action of the AGC. In extreme cases, the saturation of the output amplifier could cause large errors in the gain setting of the received signal which could result in a failure to decode the symbol being scanned.

In addition, the prior art AGC circuits set the initial system gain at maximum and then relatively slowly reduce the gain in cases where the input signals have relatively large amplitudes.

Also, prior art AGC systems use large capacitors to detect signal peaks and to set the AGC attack times. The use of large capacitors increases the required circuit real estate and introduces size limitations. As such, the prior art AGC circuits using large capacitors may not be designed into a single integrated circuit.

Other prior art AGC systems, such as the one disclosed in U.S. Pat. No. 5,668,505, issued to Vu et al. and assigned to the assignee of the present invention, use single input dual output AGC control. U.S. Pat. No. 5,668,505 to Vu et al. is also incorporated herein by reference. While this type of digital AGC system can control the gains of more than one amplification stage, the AGC circuit determines the stage gain settings based only on the value of a single input signal, which is either the output of the last amplification stage or the modified output of the last amplification stage. Thus, there is no preemptive sampling of the multiple stages in order to find an in-range signal, and the "attack time" may still be relatively slow.

SUMMARY OF THE INVENTION

In view of the above-mentioned features and limitations of the typical AGC circuits that degrade the receiver's steady state response time with reduction of the "attack time", a digital AGC circuit which quickly adjusts overall receiver gain would be highly desirable. It is accordingly an object of the present invention to fulfill this need by providing a digital automatic gain control circuit with the capability of providing a decodable signal within a much shorter period of time, without introducing large signal amplitude errors.

Another object of the invention is to provide a digital automatic gain control circuit which includes a multiple inputs and multiple outputs for controlling the gains of the multiple amplification stages.

Another object of the invention is to provide a digital automatic gain control circuit which can set the initial system gain to other than the maximum value.

Another object of the invention is to provide a digital automatic gain control circuit which can detect receiver out of range signal amplitude and disable the digital bar pattern signal from entering the decoder.

Another object of the invention is to provide a digital automatic gain control circuit which does not use large capacitors and can be built into a integrated circuit.

Another object of the invention is to provide a digital automatic gain control circuit which includes multiple inputs and multiple gain control loops.

The present invention relates to a multi-stage digital Automatic Gain Control (AGC) circuit for selectively sampling the outputs of a serially connected amplification stages and for selectively controlling the gain of one or more stages in order to keep the amplitude of the final stage output within a predetermined range. The AGC provides a "quick" adjustment to overall system gain so that the system can produce a regulated signal within a short period of time, thereby improving the regulation response time.

The AGC includes a number of serially connected amplification stages and a gain controller. The output of each amplification stage, in addition to feeding the next amplification stage, is also an input to the gain controller. The gain controller receives the amplification-stage outputs, processes the outputs, determines the required gains of the various amplification stages and adjusts the gains via a number of gain control signals. The gain controller, in turn, includes a sensing logic for sensing and processing the amplification-stage outputs, and a gain adjuster for determining and adjusting the required gains. All the gains can be adjusted in a single cycle and the overall system gain can be quickly stabilized without compromising accuracy. In contrast to the prior art AGC circuits, the present invention need not attenuate the analog signal in any of its amplification stages, thus avoiding a reduction in the overall signal-to-noise ratio of the system. The use of an analog-to-digital converter within the sensing logic eliminates the maximum input-voltage-limit requirement present in the prior art analog AGC circuits. Due to the fast attack time of the invented AGC circuit, the initial gains of the individual amplification stages are not limited to any specific value.

As will be described in detail below, the AGC circuit of the present invention provides for an improvement in AGC response time, thus rendering the system more impervious to signal amplitude and frequency variations, as well as low frequency background noise components. In addition to improving AGC response time, the AGC circuit of the present invention dynamically adjusts the overall receiver gain more efficiently without compromising accuracy. The sensing logic and the gain adjuster can be built using digital logic and can be combined with the analog amplification stages into a single mixed mode integrated circuit. The result is a new digital AGC which can be built on a single integrated circuit (IC) and which is capable of fast attack times without sacrificing system accuracy and stability.

Various alternative embodiments of the digital AGC are presented. In addition, a new scanner is also invented that takes advantage of the special features of the new AGC.

A printing device and a scanning device associated with the new AGC are described, as well as a system for utilization of the advantages provided by the new AGC.

DETAILED DESCRIPTION OF THE PREFERRED EMBODIMENT

Figure 1:
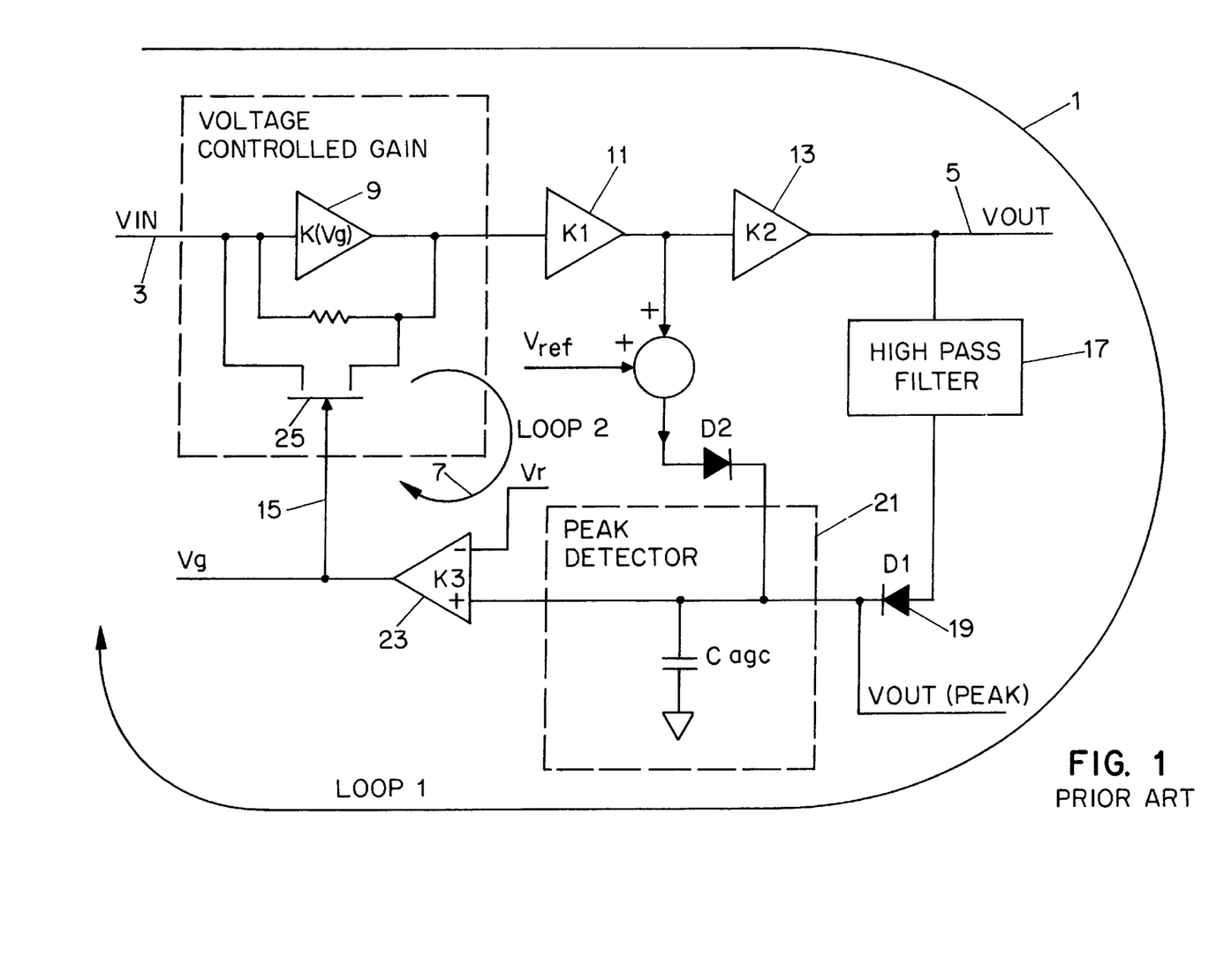
FIG. 1 is an electrical diagram of a prior art analog AGC.

Turning to the drawings, FIG. 1 is an electrical diagram of a conventional analog automatic gain control ("AGC") circuit utilized to control the gain in a laser scanning system receiver. The block diagram represents a dual feedback path control circuit with an input signal 3 (Vin) and an output signal 5 (Vout). The first feedback loop is illustrated as reference number 1. The second feedback loop is illustrated as reference number 7. The receiver comprises an amplifier section having at least three amplifiers 9, 11 and 13. The voltage gain of amplifiers 11 and 13 is fixed at K1 and K2, respectively, while the voltage gain K(Vg) of amplifier 9 is variable and controlled by error voltage signal 15 (Vg). The output signal is sensed in the feedback loop 1 comprising a high pass filter 17, rectifier 19, peak-detector 21, and an error amplifier 23 having a gain of K3. The second loop 7 is used to sense the received signal at the output of amplifier 11. While this feedback provides an improved response time at start up, it is essentially non-operational during the rest of the regulation period. In addition, because the system includes only a single gain adjusting stage, the overall dynamic gain of the system is limited. Moreover, the capacitors used in the peak detector 21 and the high pass filter 17, may prevent the circuit from being implemented in a single IC. The system gain is controlled by adjusting the voltage at the gate of the gain control transistor 25. Because the transistor 25 operates as a voltage controlled resistor, it has a maximum input voltage limit. The analog AGC regulates the overall system gain by attenuating the gain of the amplifier 9. While this process is useful for producing the required output amplitude, signal attenuation is generally not desirable because it reduces the overall system signal-to-noise ratio. This is like throwing away a good portion of the true signal.

Figure 2:
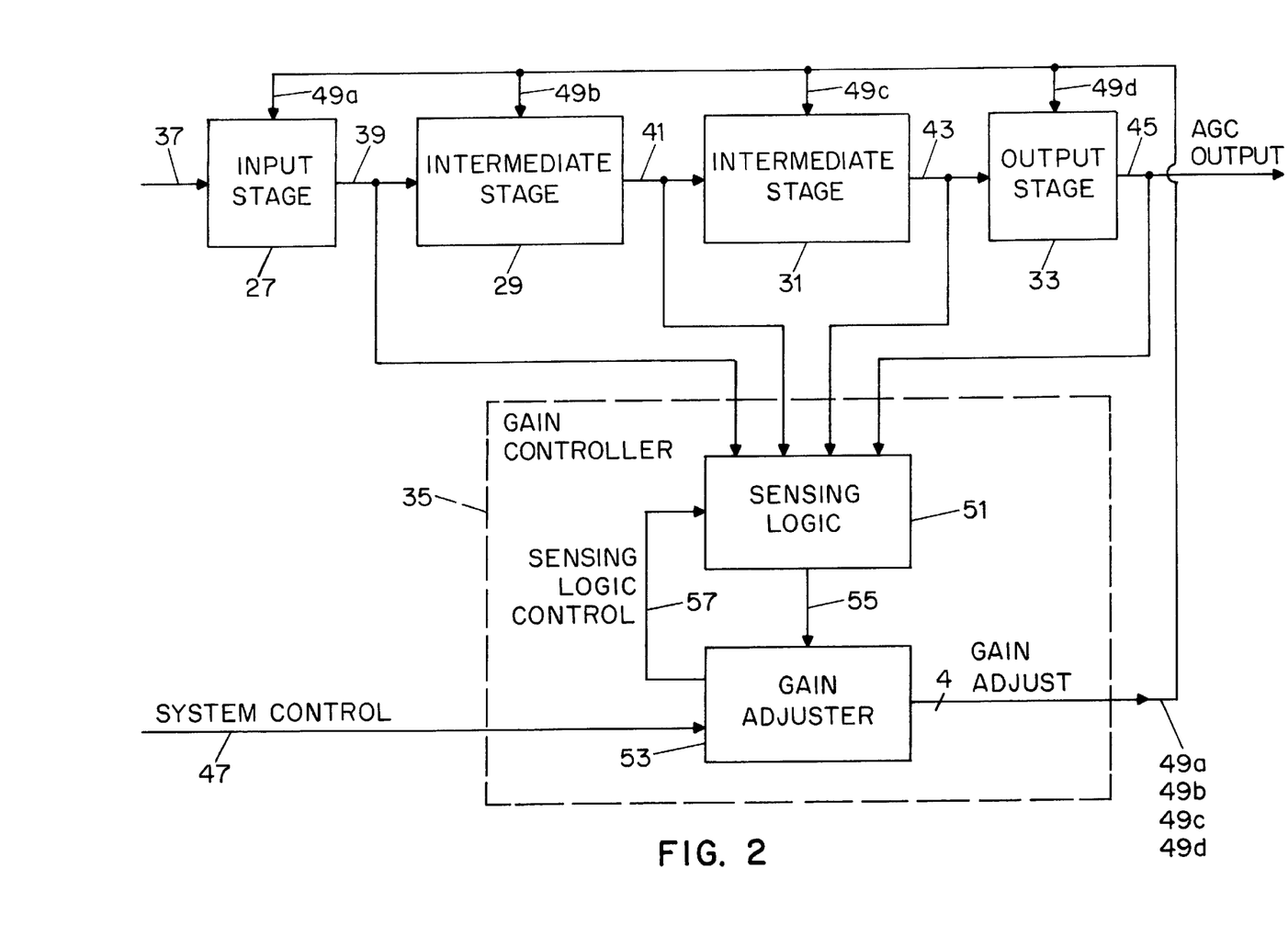
FIG. 2 is a system block diagram of the present invention.

The present invention depicted in FIG. 2 relates to a multi-stage Automatic Gain Control (AGC) circuit for selectively sampling the outputs of a serially connected amplification stages and for selectively controlling the gain of one or more stages in order to keep the amplitude of the output of the final stage within a predetermined range. The circuit can be used in a various systems where an amplitude of a particular signal has to be kept relatively constant. Such system may include a bar code reader, a radio transceiver, or other types of receivers. FIG. 2 depicts a block diagram of the preferred embodiment of the invention. The invention includes a number of serially connected gain adjustable analog amplification stages 27, 29, 31 and 33, and a gain controller 35. Input amplification stage 27 represents the first gain stage of the AGC circuit. It receives its input signal on line 37 and outputs an amplified signal on line 39. The output 39 is an input to an intermediary gain stage 29 which produces its output signal on line 41. Output 41 of the intermediary amplification stage 29 feeds another intermediary amplification stage 31, which in itself could represent a number of serially connected intermediary amplification stages and is being depicted as a single block for simplification of the discussion. The output 43 of stage 31 is an input to the final amplification stage 33 which produces a regulated AGC output on line 45. The stage-outputs 39, 41, 43 and 45 of the amplification stages 27, 29, 31 and 33, respectively, are also connected to the gain controller 35.

The gain controller 35 is in turn controlled by a set of system inputs, represented as a reference numeral 47, which will be explained in more detail with respect to FIGS. 3 and 4. The gain controller 35 receives the amplification stage-outputs 39, 41, 43 and 45, processes the stage-outputs and determines the required gains of the various amplification stages needed to keep the output 45 within a predetermined amplitude range. The proper gain settings of the various gain stages are determined by, starting with the first stage, analyzing the maximum sampled amplitude of each stage-output signal and locating a stage-output the maximum amplitude of which is within the expected amplitude range. If such stage-output is found, the controller determines the proper gain settings for the other amplification stage down the chain and with one adjustment via a set of gain control signals on lines 49a, 49b, 49c and 49d sets the gains of those stages, thus regulating the amplitude of the output on line 45. It should be noted that the present system does not attenuate, but amplifies, the analog signal, thus avoiding a reduction of the signal-to-noise ratio present in the prior art analog AGC system. In addition, unlike the prior art analog AGCs, the use of an analog-to-digital converter, discussed below, in the digital AGC of the present invention eliminates a maximum input-voltage-limit requirement.

In the preferred embodiment of the invention the regulated AGC output should be around 2V. If, for example, the gain controller locates a signal with a maximum amplitude between 0.5 volts and 2.0 volts at the output of the amplification stage 29, with a single adjustment of the gains of stages 31 and 33, the system will produce the AGC output 45 having a maximum amplitude of 2.0 volts. Thus, if the maximum amplitude of output 41 of stage 29 is 0.5 volts, the gain adjuster could set the gain of stage 31 via line 49c to a value of four, and could also set the gain of stage 33 via line 49d to a value of one. This way, the maximum amplitude of AGC output signal on line 45 will be set to 2.0 volts. While in the preferred embodiment, stages 27, 29 and 31 are designed to have their gains adjusted by a factor of 2, the amplification stage 33 can have a finer adjustment resolution in order to allow for fine-tuning of the amplitude of the AGC output on line 45. Other combinations of gains of stages 27, 29, 31 and 33 are possible. Thus, by monitoring outputs of the individual amplification stages, the overall system gain can be speedily adjusted and the system can be quickly stabilized.

As shown in FIG. 2, the gain controller 35, includes a sensing logic 51 and a gain adjuster 53. The sensing logic 51 samples the outputs of the amplification stages, converts the sensed analog amplitudes to a digital values and outputs a digital sense signal on line 55 to the gain adjuster 53. The gain adjuster 53, which can either be a digital state-machine or a microprocessor, receives the digital sense output 35 and performs the gain adjustment calculations. Gain control signals 49a, 49b, 49c and 49d, mentioned above, are outputs of the gain adjuster 53. In addition to providing the gain control signals on lines 49a, 49b, 49c and 49d, the gain adjuster 53 may, depending on the embodiment, control the sampling of the stage outputs 39, 41, 43 and 45 by the sensing logic 51 via a sensing logic control signal on line 57. Because the adjustment of the system gain can be done right after the first sampling and adjusted up or down, the gains of the individual amplification stages can be initially set to nominal values, unlike the present day AGC systems which set the initial system gains at maximum and then relatively slowly adjust the gains in the downward direction. Because a number of stages can be selectively sampled and their gains can be selectively controlled in a single cycle, the response time of the invented AGC is faster then the response time of the prior art AGC systems.

The time period at which an output is sampled determines the aggressiveness of the AGC circuit. The gain controller may start adjusting the gains of the individual stages after taking more then one measurement. Thus, if the input signal 37 contains a large noise spike of short duration in comparison to a data frame and preceding or following the data frame, multiple sampling of data within a single data frame will allow for averaging of the output signals and for minimizing of the AGC error. This approach can be advantageously applied in bar code scanning, where specular reflections from the reflected laser beam can set the gain of the AGC circuit to an incorrect value and cause a large error in the final AGC output.

Also, the system of the present invention can have the same response time regardless of whether the AGC gain is being increased or reduced from its initial setting. Because the gain of each amplification stage can be independently varied, the system can have a large dynamic range of operation as compared to the prior art systems where the gain adjustment is limited to one or two gain stages. Unlike the prior art systems, the applicant's AGC does not exhibit frequency dependencies and can accommodate signals over a wide frequency range. Moreover, the various amplification stages can have different gain adjustment resolution, allowing for coarse and fine gain control adjustments. Because the gain controller can be implemented using digital logic, it does not require the use of large capacitors associated with the present day AGC systems and can be built on a single integrated circuit chip, thus reducing the required system real estate. Because the system includes both analog and digital circuits, it could be implemented in a mixed mode analog specific integrated circuit (ASIC) using a small geometry CMOS or other type of transistors. Unlike the traditional AGC circuits which are limited in the maximum useful gain due to system stability limitations, the invented AGC spreads the gain over a number of stages, thus reducing the potential stability problems associated with high gain, high bandwidth amplification stages.

Figure 3:
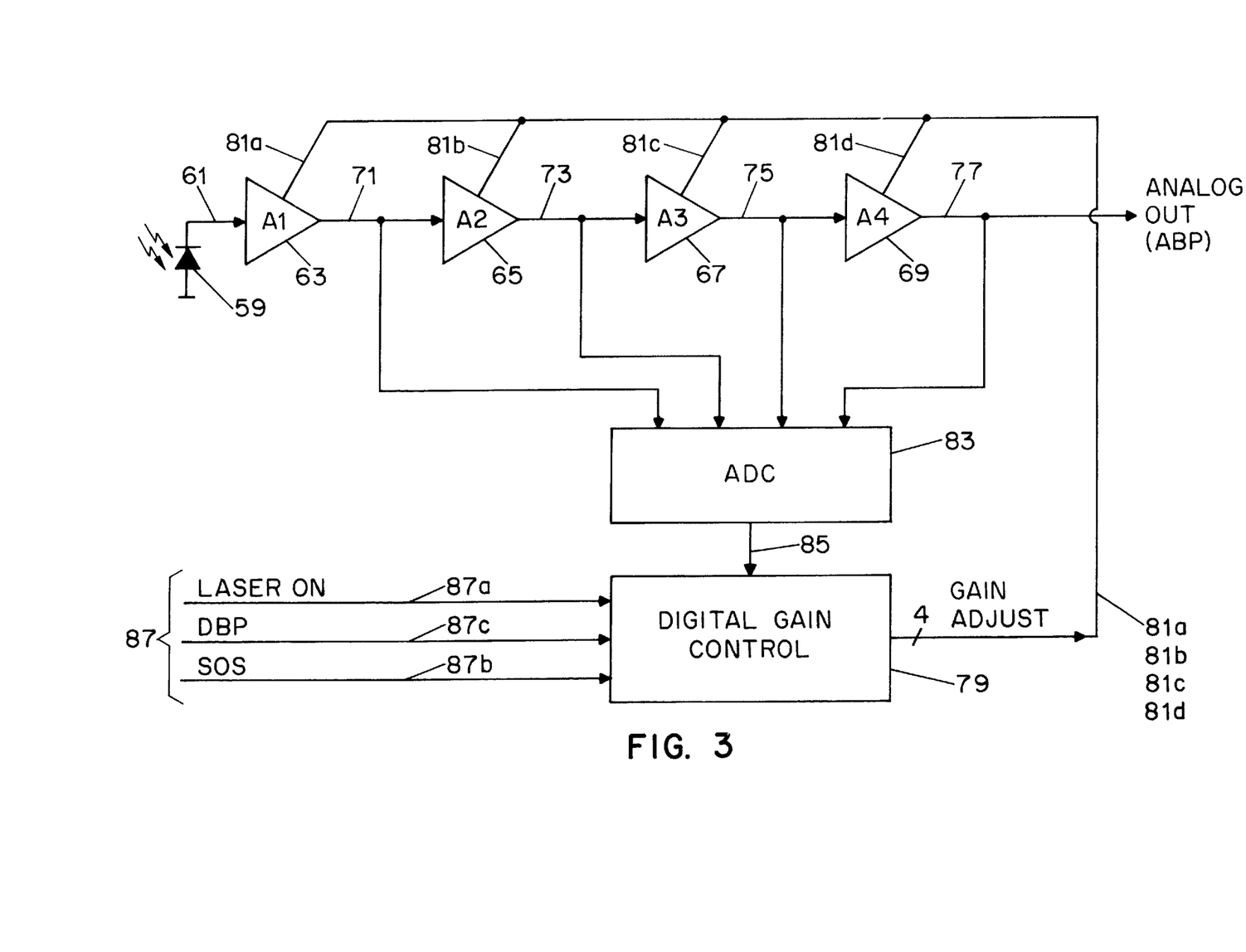
FIG. 3 is an expended block diagram of the preferred embodiment of the present invention.

FIG. 3 is an expanded block diagram of the preferred embodiment of the present invention. The figure is directed at the optical receiver circuits, such as the ones present in bar code scanners. An optical detector 59 receives an incoming light and produces an input signal 61 on the input of the first amplification stage 63. Input 61 corresponds to the input 37 of FIG. 2. Amplification stages 63, 65, 67 and 69 correspond to the amplification stages 27, 29, 31 and 33 of FIG. 2, respectively. Outputs 71, 73, 75 and 77 correspond to outputs 39, 41, 43 and 45 of FIG. 2, respectively. Gain adjuster 79 corresponds to the gain adjuster 53 of FIG. 2. Gain adjust lines 81a, 81b, 81c and 81d correspond to the gain adjust lines 49a, 49b, 49c and 49d of FIG. 2, respectively. FIG. 3 provides a more detailed view of the sensing logic 51 of FIG. 2. It shows that the amplification stage outputs 71, 73, 75 and 77 are connected to an analog-to-digital converter (ADC) 83. The ADC 83 samples the stage outputs often enough to generate the sampled analog signal profile and to produce the digital values representative of the sampled analog signals. The output 85 of the ADC 83 corresponds to sense logic control signal 55 in FIG. 2. The frequency of sampling of the stage output signals is dependant upon the system control signals "Laser On" 87a, "SOS" 87b and "DBP" 87c. "Laser On" informs the gain adjuster that the laser has come on and that scanning will begin shortly. "SOS" 87b is a start-of-scan signal representing the start and stop locations of a scanning mechanism which produces a laser scan line. It acts as a separator between the signal data frames. The SOS can be used for timing of the gain changes, i.e. changing gains only on SOS boundaries. This can prevent gain transients from occurring during the time when the signals are being sampled. "DBP" 87c, represents the digital bar pattern which is produced as a result of the conversion of the AGC output 77 from an analog to a digital signal. The DBP is used by the decoder to decode the content of the optical information sensed by the optical detector 59. The DBP signal can be used to clock the ADC for fine tune adjustments at the final AGC output. In turn, the digital section of the AGC can lockout the DBP when making gain changes to prevent transients from passing to the other parts of the system. The ADC 83 of the present embodiment must sample the stage-outputs 71, 73, 75 and 77 quickly enough to be guarantee at least one sample at near the peak amplitudes of each stage-output signal. The speed requirements of the ADC 83 will not only depend upon the analog signal characteristic, but will also depend upon the number of amplification stage outputs being sampled. Thus, the increase in the number of amplification stages and the rate of change of the output signals 71, 73, 75 and 77, requires an increase in the conversion speed of the ADC 83. In the area of bar code scanning, the ADC capable of 1 microsecond, or faster, conversion speeds may be required.

The embodiment of FIG. 3 may require a fast and relatively expensive analog-to-digital converter. In applications where the costs of high sped ADC are prohibitive, the system illustrated in FIG. 4 may be utilized. In it, the fast ADC 83 of FIG. 3, has been replaced by four peak detectors 89, 91, 93 and 95, and a slower ADC 97. Unlike the ADC 83 of FIG. 3, which must sample each stage output many times during a particular time period in order not to miss the signal peak, the ADC 97 of FIG. 4 has a greatly reduced sampling burden. Because the peak detectors in FIG. 4 have already found the peaks of their respective stage outputs, the ADC 97 needs to perform an analog-to-digital conversion on each peak detector output only once during a predetermined time period. FIG. 4 shows that the stage outputs 99, 101, 103 and 105 are connected to their corresponding peak detectors 89, 91, 93 and 95. The peak detectors are used to detect the maximum amplitudes of the individual stage outputs and can be either negative, positive or dual phase peak detectors. Using dual phase peak detectors provides for more accurate detection of the output signal amplitude. In the preferred embodiment of FIG. 4, the peak detectors 89, 91 and 93 are positive peak detectors, while peak detector 95 is a dual phase peak detector. The peak detectors can also be utilized to filter out slow moving background signal components, such as ambient light components. The peak detector outputs 107a, 107b, 107c and 107d are inputs to the ADC 97. The output 109 of the ADC 97 corresponds to the sense logic control signal 55 of FIG. 2. The reset signals 111a, 111b, 111c and 111d from of the gain adjuster 113 are used to reset the peak detectors 89, 91, 93, 95, respectively, in order to prepare the peak detectors for a subsequent sampling attempts. The reset signals 111a, 111b, 111c and 111d correspond to the sensing logic control signal 57 of FIG. 2. Although renumbered, the other elements of FIG. 4 remain functionally the same as the elements of FIG. 3.

Figure 4:
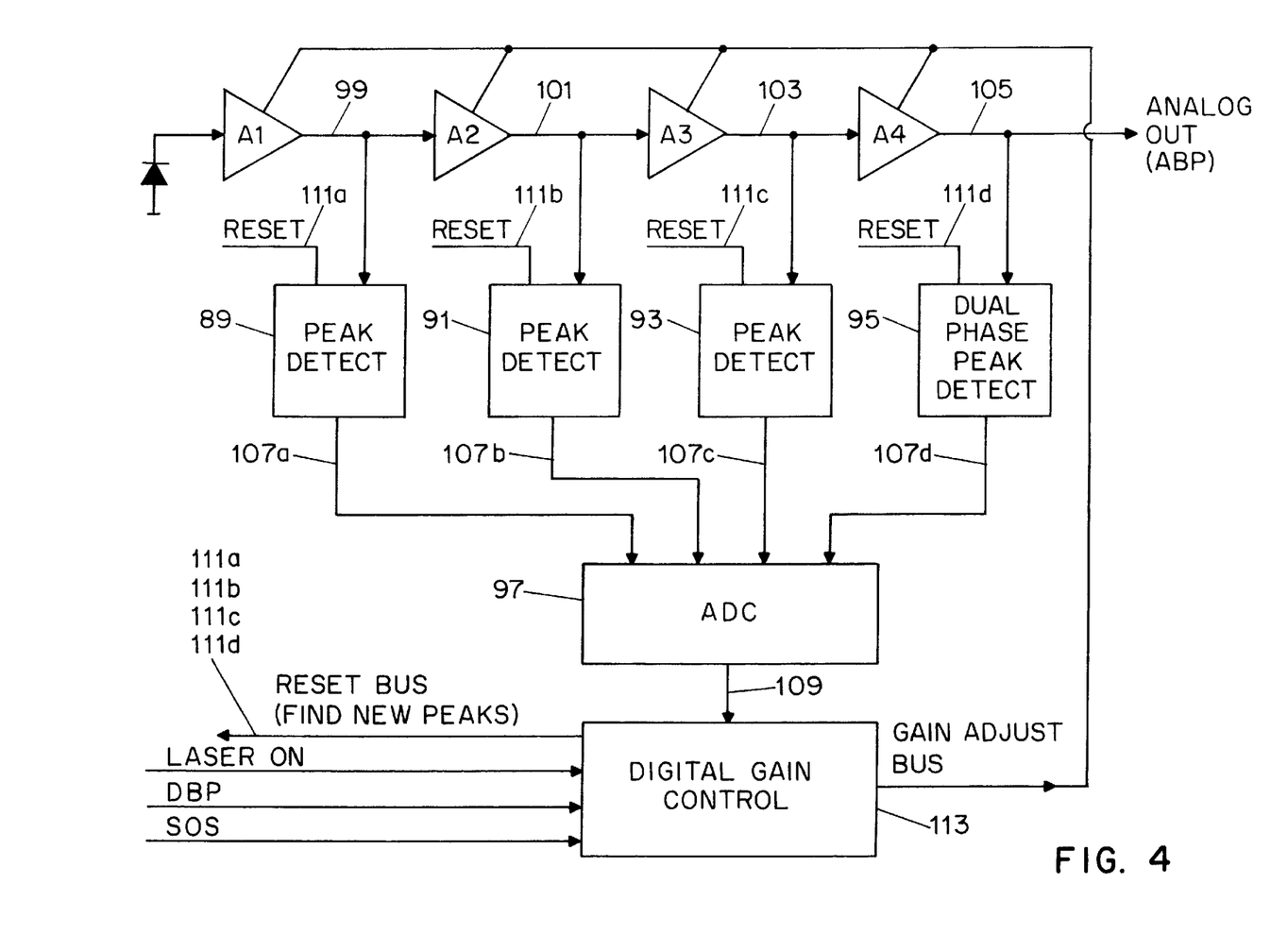
FIG. 4 is a block diagram of an alternative embodiment of the present invention.

In both embodiments, FIG. 3 and FIG. 4, the ADC outputs 85 and 109 represent a time-multiplexed digital signal values corresponding to the sampled outputs of the ADC inputs. In such situation, the ADCs 83 of FIG. 3 and 97 of FIG. 4 each include a multiplexer for multiplexing their respective multiple inputs, and the gain adjusters 79 of FIG. 3 and 113 of FIG. 4, require a single input for accepting the ADC's output. In an alternative embodiment, each of the ADCs 83 and 97 can be replaced by four ADCs, each of the four being dedicated to a particular peak detector. Therefore, instead of having four inputs into and a single output from the ADCs of FIGS. 3 and 4, the alternative embodiment will have four ADCs each one having an input from its corresponding amplification stage or a peak detector and an output into the Gain Adjuster. The gain adjuster would then have to process the four outputs of the four ADCs in order to calculate the required gains for each amplification stage. In order to process the outputs of the four ADC, the gain adjuster will either have four separate input ports or it will include it own multiplexer.

While the invention has been described with respect to changes in the amplifiers gains, it is understood that the frequency characteristic of each of the amplification stage may also need to be controlled. This is accomplished by various techniques well known in the art of signal processing.

In another embodiment of the invention the digital AGC could be combined with an analog AGC. For example, the coarse adjustments could be made using the digital AGC, while the fine adjustment could be made using the analog AGC.

Other embodiments of the present invention are possible. For example, the invention may require monitoring of only some of the amplification stages. In addition the gains of some of the amplification stages may be fixed. Circuits other than the peak detectors may be used to process the analog outputs. System noise requirements may impose other constrains on the gain distribution, such as placing greater gains in the front stages of the amplification chain. Algorithms for allocating gain distributions may take into account such factors as an incoming signal power level, system noise, background noise, frequency compensation of the gain stages, equality of the gain distribution among the stages, speed of gain adjustment in the individual stages, etc.

Figure 5:
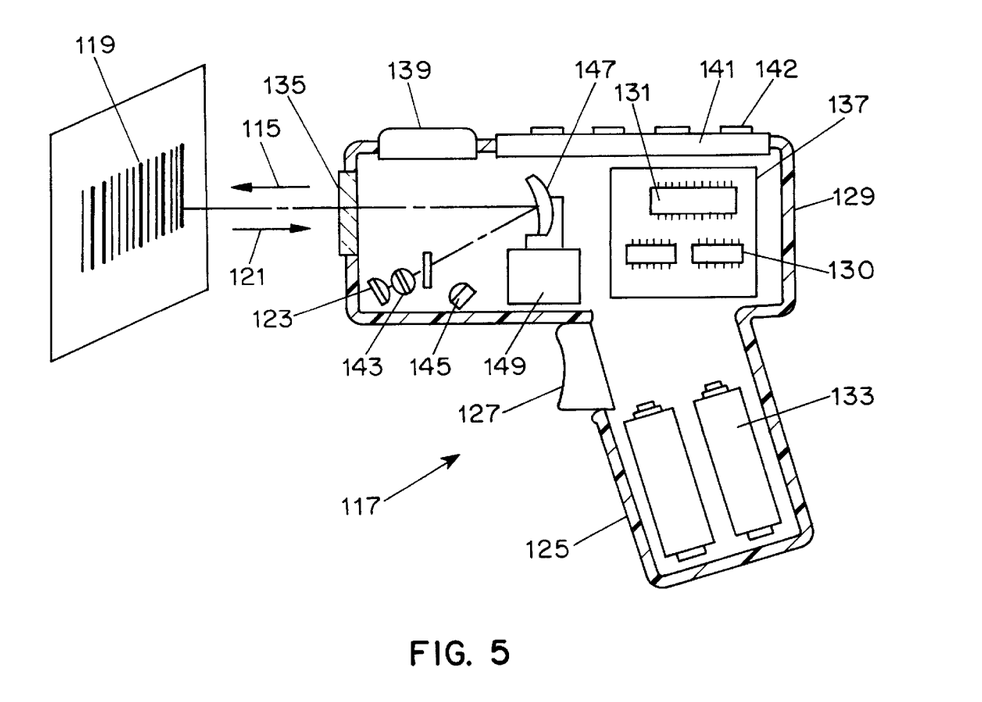
FIG. 5 is an illustration of a bar code reader utilizing the present invention.

The present invention may be incorporated in a hand-held, laser-scanning, bar code reader such as illustrated in FIG. 5. This hand-held device of FIG. 5 is generally of the type disclosed in U.S. Pat. No. 4,760,248 issued to Swartz et al., assigned to Symbol Technologies, Inc. Alternatively, or in addition, features of U.S. Pat. No. 4,387,297 issued to Swartz et al., or U.S. Pat. No. 4,409,470 issued to Shepard et al., both such patents assigned to Symbol Technologies, Inc., may be employed in constructing the bar code reader of FIG. 5. These U.S. Pat. Nos. 4,760,248, 4,387,297 and 4,409,470 are incorporated herein by reference. An outgoing light beam, 115, is generated in the reader, 117, usually by a laser diode or the like, and directed to impinge upon the bar code symbol 119, generally located some distance away from the reader unit. The outgoing beam 115 is scanned in a fixed linear pattern, or a more complex pattern may be employed, and the user positions the hand-held unit so this scan pattern traverses the symbol to be read. Certain scan pattern characteristics can be utilized for alignment of the reader unit to the bar code. Other visual techniques may be associated for scan pattern to bar code alignment. Reflected light 121 from the symbol is detected by a light-responsive device 123 in the reader unit, producing serial electrical signals to be processed for identifying the bar code. The reader 117, is a gun shaped device, having a piston-grip type of handle 125 and movable trigger 127, employed to allow the user to activate the light beam 115 and detector circuitry when pointed at the symbol to be read, thereby saving battery life if the unit is self-powered. A light-weight plastic housing 129, contains a laser light source, the detector 123, the optics, signal processing circuitry including the AGC 130 and the CPU 131, as well as the battery 133. A light-transmissive window 135, in the front end of the housing 129 allows the outgoing beam 115 to exit and the incoming reflected light 121 to enter. The CPU 131 is located on the circuit board 137. Multiple circuit board designs could also be used. The reader may have a display 139, as well as a manual entry control panel 141. The control panel may have a display scroll-and click key 142 which allows the operator to use a single key for both operations, scrolling of the display until an item of interest is found and then clicking on the item of interest to bring up additional information about the item. This type of control key is basically a dual function control key, and could be utilized for other than display control purposes.

As seen in FIG. 5, a suitable lens 143 (or multiple lens system) is used to collimate and focus the scanning beam 115 onto the bar code symbol 119 at an appropriate reference plane, and this same lens 143 may be used to focus the reflected light 121 onto a photodetector 123. A light source 145, such as a semiconductor laser diode, is positioned to introduce a light beam into the axis of the lens 143 by a partially-silvered, or reflective, mirror and the other lenses or beam-shaping structure as needed, along with an oscillating mirror 147 which is attached to a scanning motor 149, activated when the trigger 127 is pulled. If the light produced by the source 145 is not visible, an aiming light may be included in the optical system, again employing a partially-silvered mirror to introduce the bean into the light path coaxially with the lens 143. The aiming light if needed, produces a visible-light spot which is scanned just like the laser beam, the user employs this visible light to aim the reader unit at the symbol before pulling the trigger 127.

In bar code laser scanners, the AGC can be made to hold the last gain setting during the time when the laser is off. This is useful in applications when laser blinking is used to reduce scan line width, intensity, or for object sensing applications in scan-stand modes. Bar code readers used to decode the bar codes printed according to the invention may contain wireless communication transceivers for communication with the host terminal. Peripheral devices, such as printers, can be interconnected to the bar code reader of the present invention either by hardwired cables or by wireless communication channels. In addition to laser bar code readers, the present invention can also be used in a CCD bar-code readers and imagers.

The preferred embodiment of the invention has been described above. It should be obvious to one skilled in the art that other embodiments of the present invention are within the spirit of the invention.

What is claimed is:

1. A digital automatic gain control (AGC) circuit comprising:
   a) a plurality of serially connected gain stages, with each gain stage of said plurality of gain stages producing a gain stage output; and
   b) a gain controller for selectively sampling the gain stage outputs of at least two gain stages of said plurality of gain stages and for adjusting a gain of at least one gain stage of said plurality of gain stages based on said sampling, said gain controller including
      i) a sensing circuit for selectively sampling the gain stage outputs of said at least two gain stages and producing a time-multiplexed digital output signal corresponding to the amplitudes of said selectively sampled gain stage outputs; and
      ii) a gain-adjusting circuit for processing said time-multiplexed digital output signal and for adjusting the gain of at least one gain stage of said plurality of gain stages;
   whereby the gain stage output signal of the last gain stage is kept within a predetermined amplitude range.

2. The AGC of claim 1, wherein said gain-adjusting circuit comprises a microprocessor.

3. The AGC of claim 1, wherein said gain-adjusting circuit comprises a digital state-machine.

4. The AGC of claim 1, wherein said sensing circuit comprises an analog-to-digital (A/D) converter for producing said time-multiplexed digital output signal.

5. The AGC of claim 4, wherein said gain stage outputs also serve as a set of time-multiplexed inputs into said A/D converter.

6. The AGC of claim 5 wherein said A/D converter is capable of conversion speed faster then 1 microsecond.

7. The AGC of claim 4, wherein said sensing circuit further comprises at least two peak-detectors for peak detecting the amplitudes of the corresponding gain stage outputs of said at least two gain stages and providing inputs to said A/D converter.

8. In a scanning device for repetitively scanning a target, said device having a receiver including optical means for producing a signal from light reflected off said target, said receiver having an operating gain, and an automatic gain control circuit for dynamically adjusting said operating gain, said automatic gain control circuit comprising:
   a) a plurality of serially connected gain stages, with each gain stage of said plurality of gain stages producing a gain stage output signal; and
   b) a gain controller for selectively sampling the gain stage outputs of at least two gain stages of said plurality of gain stages and for adjusting a gain of at least one gain stage of said plurality of gain stages based on said sampling, said gain controller including i) a sensing circuit for selectively sampling the outputs of at least two gain stages of said plurality of gain stages and producing a time-multiplexed digital output signal corresponding to the amplitudes of said selectively sampled gain stage outputs; and ii) a gain adjusting circuit for processing said time-multiplexed digital output signal and for selectively adjusting the gain of at least one gain stage of said plurality of serially connected gain stages;

whereby the output signal of the last gain stage is kept within a predetermined amplitude range.

9. The AGC of claim 8, wherein said gain adjusting circuit comprises a microprocessor.

10. The AGC of claim 8, wherein said gain adjusting circuit comprises a digital state-machine.

11. The AGC of claim 8, wherein said sensing circuit comprises an analog-to-digital converter for producing the time-multiplexed digital output signal.

12. The AGC of claim 11, wherein said gain stage outputs also serve as a set of time-multiplexed inputs into said A/D converter.

13. The AGC of claim 11, wherein said sensing circuit further comprises at least two peak-detectors for peak detecting the amplitudes of the corresponding analog stage outputs of said at least two gain stages of said plurality of gain stages and providing inputs to said A/D converter.

14. A method for regulating an amplitude an analog signal in a system including a plurality of serially connected gain stages each having a gain stage output, said method comprising the steps of:

a time multiplexing said gain stage outputs;

b) selectively sampling the outputs of at least two gain stages of said plurality of serially connected gain stages, said selective sampling step further including a step of converting said gain stage outputs from an analog to a digital form; and c) selectively adjusting the gain of at least one gain stage of said plurality of serially connected gain stages based on said sampling.

15. A digital AGC comprising:

a) a plurality of serially connected gain stages, with each gain stage of said plurality of gain stages producing a gain stage output signal;

b) a sensing circuit for selectively sampling the gain stage outputs of a number of said gain stages of said plurality of gain stages and producing a time-multiplexed digital output signal corresponding to the amplitudes of said selectively sampled gain stage outputs; and c) a gain adjusting circuit for selectively processing said time-multiplexed digital output signal and for selectively adjusting the gain of at least one gain stage of said plurality of serially connected gain stages.

* * * * *